United States Patent

Manz

[11] Patent Number: 5,488,878
[45] Date of Patent: Feb. 6, 1996

[54] GEAR TRANSMISSION WITH CONTROLLER

[75] Inventor: Dieter Manz, Eriskirch, Germany

[73] Assignee: ZR Friedrichshafen AG, Friedrichshafen, Germany

[21] Appl. No.: 196,244

[22] PCT Filed: Aug. 27, 1992

[86] PCT No.: PCT/EP92/01968

§ 371 Date: Feb. 17, 1994

§ 102(e) Date: Feb. 17, 1994

[87] PCT Pub. No.: WO93/05324

PCT Pub. Date: Mar. 18, 1993

[30] Foreign Application Priority Data

Aug. 30, 1991 [DE] Germany .................. 41 28 834.3

[51] Int. Cl.$^6$ .......................... F16D 23/06; B60K 41/22; F16H 3/38
[52] U.S. Cl. .................. 74/339; 192/3.55; 192/3.61; 192/3.63
[58] Field of Search ............... 192/3.63, 3.54, 192/3.55, 3.61; 74/339

[56] References Cited

U.S. PATENT DOCUMENTS

| | | | |
|---|---|---|---|
| 4,194,410 | 3/1980 | Richards | 74/339 |
| 4,221,283 | 9/1980 | Nordkvist et al. | 74/339 X |
| 4,409,857 | 10/1983 | Lasoen | 74/339 X |
| 4,467,665 | 8/1984 | Katayama et al. | 74/339 |
| 4,572,020 | 2/1986 | Katayama | 74/339 X |
| 4,785,681 | 11/1988 | Kuratsu et al. | 74/339 |
| 5,012,416 | 4/1991 | Bulgrien et al. | 192/3.63 X |
| 5,054,591 | 10/1991 | Braun | 192/3.63 |
| 5,103,948 | 4/1992 | Sato et al. | 192/3.55 X |
| 5,385,223 | 1/1995 | Certeza | 74/339 X |

FOREIGN PATENT DOCUMENTS

| | | |
|---|---|---|
| 0114513 | 8/1984 | European Pat. Off. . |
| 0260133 | 3/1988 | European Pat. Off. . |
| 56-113853 | 9/1981 | Japan .................. 192/3.63 |
| 2159899 | 12/1985 | United Kingdom . |
| WO86/05449 | 9/1986 | WIPO . |

Primary Examiner—Rodney H. Bonck
Assistant Examiner—Nathan O. Jensen
Attorney, Agent, or Firm—Herbert Dubno; Andrew Wilford

[57] ABSTRACT

Synchronized forward speed ranges and an unsynchronized reverse range are automatically selected in a gear transmission. The reverse speed range is selected when with an open main clutch at first a synchronizing device for a forward speed range is actuated and once a permissible shifting speed is reached this shifting is started and the reverse speed range is selected. The main clutch remains open for the duration of the shifting operation.

2 Claims, 1 Drawing Sheet

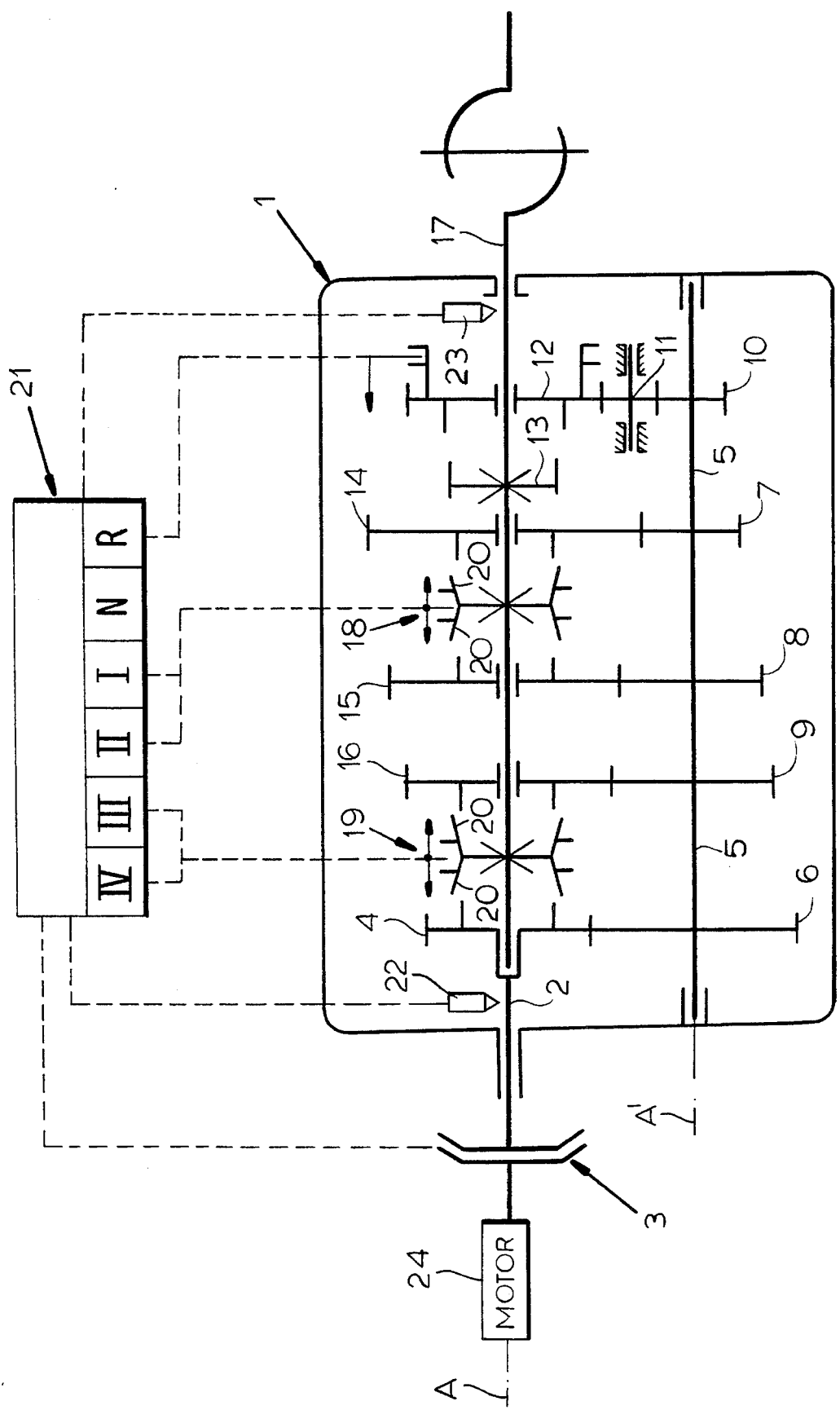

GEAR TRANSMISSION WITH CONTROLLER

CROSS REFERENCE TO RELATED APPLICATIONS

This application is the U.S. national phase of PCT application PCT/EP92/01968 filed 7 Aug. 1992 with a claim to the priority of German application P 41 28 834.8 itself filed 30 Aug. 1991.

FIELD OF THE INVENTION

The invention relates to a gear transmission and a method of operating same. More particularly this invention concerns such a transmission having a controller that switches synchronized jaw clutches responsible for the speed changes and a main clutch that interrupts the traction force.

BACKGROUND OF THE INVENTION

Such gear transmissions are known in many types, for example from published PCT application WO 86/05449 filed 12 Mar. 1985 by G. Bieber. Normally with other synchronized transmissions only the forward ranges are provided with synchronizing devices while the reverse speed ranges have a simple jaw clutch without any synchronizing device. Such transmissions are indeed simple in construction but their gears clash when shifted into reverse due to an excessively high speed differential between the shafts being shifted and the changing time is long since the clashing only slowly decreases the speed differences. In addition this gear-clashing subjects the teeth to wear so that they do not engage properly and eventually can not be shifted easily or at all because one tooth directly engages another.

OBJECT OF THE INVENTION

It is therefore an object to provide and improved and simplified gear transmission and method of operating a gear transmission.

SUMMARY OF THE INVENTION

This object is achieved according to the invention in that the reverse speed ranges have no synchronizing device. After opening of the main clutch the controller at first activates a synchronizing device of a forward-speed range below a programmable maximum rotation rate of the input shaft on shifting into the reverse speed range and releases the device and shifts into the reverse-speed range before the main clutch closes when the rotation speed is below a programmable target rotation rate of the input shaft.

Since the transmission according to the invention has no synchronizing device for the reverse speed ranges it is simple in construction and the main clutch can easily be operated. In spite of this there are no disturbing noises on shifting into reverse because the shafts being shifted by the controller have been brought by means of the synchronizing device of a forward speed range to an acceptable relative rotation rate. This at the same time avoids wear of the jaw clutch for the reverse speed range and shortens the shifting time. In order to more easily shift the jaw clutch for the reverse speed range when the shafts being shifted are synchronized, the jaws in the clutch can be relatively sharp. Thus they fit together easily. An easily determined residual rotation rate can further facilitate the meshing so that an actual tooth-against-tooth positioning is avoided. This is above all dependent on the shape of the jaws.

Basically it is enough to activate the synchronizing device in dependence on the rotation rate of the input shaft or a rotation rate derived therefrom since the driver will know the rotation rate and rotation direction of the output shaft of the transmission based on the movement of the vehicle and will only start shifting into reverse when the vehicle is virtually stationary. Additionally the rotation rate of the output shaft can also be determined by a tachometer and fed to the controller. This establishes the relative rotation speeds of the shafts to be coupled together. In addition it is preferable to break off the shifting operation in dependence on certain criteria and to directly go into the reverse speed range before the main clutch is closed again.

Since during shifting the vehicle should be generally stationary, the rotations to be measured are small so that expensive tachometers are required. One can use simpler devices which have a higher measuring threshold when the higher rotations are compensated for by providing the controller with an empirically determined time to extend the activation time of the synchronizing device so that synchronization is achieved.

The claims describe an advantageous combination of the solutions but the person skilled in the art will consider further combination possibilities which correspond to the protected teaching.

BRIEF DESCRIPTION OF THE DRAWING

The sole FIGURE of the drawing schematically illustrates the transmission and control system of this invention.

SPECIFIC DESCRIPTION

A gear transmission 1 has an input shaft 2 extending along a main axis A and coupled by a main clutch 3 to a motor 24. An input gear 4 rotationally fixed to the input shaft 2 meshes continuously with a gear 6 fixed on an intermediate shaft 5 extending along an axis A' parallel to the axis A.

The intermediate shaft 5 has further gears 7, 8, and 9 for forward speed ranges I, II, and II as well as a gear 10 that meshes via an intermediate gear 11 with a sliding gear 12 to drive the clutch body 13 of the jaw clutch of a reverse-speed range R. Sliding gears for the first, second, and third forward-speed ranges I, II, and III are shown at 14, 15, and 16. A fourth forward-speed stage IV is created by directly coupling the input shaft or its gear 4 with the output shaft 17.

The sliding gears 14, 15, and 16 are also connectable via the double jaw clutches 18 and 19 with the drive shaft 17. To this end the double-jaw clutches 18 and 19 have synchronizing devices 20, there being no synchronizing device for the reverse speed range R.

The double-jaw clutches 18 and 19 as well as the jaw clutch 12 of the reverse speed range are operated by a controller 21. The desired speed range is selected by the driver or by an automatic shifting arrangement which is not shown. The condition and drive parameters used for the shifting can be displayed in the known manner individually or together. In addition to the desired speed range the controller 21 is supplied with information about the condition of the main clutch 3, the rotation rate of the input shaft 2 as determined by a tachometer 22, and the positions of the double-jaw clutches 18 and 19 as well as of the claw clutch 12 of the reverse speed range.

The reverse speed range R is synchronized as follows:
Startup

First the transmission is shifted into neutral N. During the entire shifting procedure the main clutch 3 is open. The tachometer 22 reads the rotation rate of the input shaft 2. If it is below a programmed maximum switching-in rotation rate but above the synchronizing rotation rate the shifting is started. To this end the controller 21 actuates one of the synchronizing devices 20 of the forward speed ranges long enough that the rotation rate is reduced to the level permitting shifting into reverse (e.g. a programmed target rotation rate).

Subsequently the actuated double-jaw clutch is reset to neutral and the sliding gear 12 of the reverse speed range is slid immediately toward the clutch body 13 which is splined on the main shaft 17.

A tachometer 23 determines the rotation rate of the output shaft 17 and feeds it to the controller 21.

I claim:

1. A method of operating a transmission having:

a main clutch adapted to be connected to an engine;

an input shaft connected to the main clutch and connectable therethrough to the engine in a closed condition of the main clutch;

an output shaft adapted to be connected to a load;

at least one forward-range input gear and at least one reverse-range input gear continuously connected to and rotated by the input shaft;

a forward-range synchronizing device and clutch operable to synchronize and couple the forward-range input gear with the output shaft; and a reverse-range jaw clutch for coupling the reverse-range input gear with the output shaft, the method comprising the steps of:

monitoring the rotation rate of the input shaft;

for forward travel sequentially, opening the main clutch, closing the forward-range device and clutch to first synchronize the forward-range input gear and the output shaft and then couple the forward-range input gear and output shaft together, closing the main clutch; and for reverse travel when the output shaft is generally stopped sequentially, opening the main clutch, closing the forward-range synchronizing device when the rotation rate of the input shaft is below a predetermined switching-in rate to couple the input gears and input shaft to the output shaft and thereby slow any rotation of the input gears and input shaft to below a predetermined threshold rotation rate, opening the forward-range synchronizing device, closing the reverse-range jaw clutch, and closing the main clutch.

2. The method defined in claim 1 wherein the reverse-range jaw clutch is closed while the input gears and input shaft are still rotating at a predetermined residual rotation rate below the threshold rotation rate to which they have been slowed.

* * * * *